Patented Dec. 5, 1950

2,533,133

UNITED STATES PATENT OFFICE 2,533,133

REPLACEMENT OF HYDROGEN WITH FLUO-RINE IN HYDROGEN- AND HALOGEN-CON-TAINING ORGANIC COMPOUNDS USING LEAD TETRAFLUORIDE

Earl T. McBee, La Fayette, Ind., and Richard M. Robb, Wilmington, Del., assignors to Purdue Research Foundation, West Lafayette, Ind., a corporation of Indiana No Drawing. Application July 4, 1945, Serial No. 603,271

10 Claims. (Cl. 260—648)

1

This invention relates to fluorine-containing organic compounds and to a method for the preparation thereof. This application is a continuation in part of application, Serial No. 552,016, filed August 30, 1944.

The preparation of fluorine-containing organic compounds by replacement of hydrogen in halogen- and hydrogen-containing organic compounds has heretofore not been accomplished readily. It is well known that elemental fluorine generally may not be reacted with organic compounds to replace hydrogen with fluorine and the reaction controlled so as to produce a desired fluorine-containing compound with any degree of satisfaction. Although certain halogens other than fluorine e. g., chlorine and bromine, may react with a wide variety of organic compounds under suitable conditions to give high yields of valuable products, the reaction of fluorine with organic compounds is usually violent in nature and is accompanied by profound decomposition of the organic compound. In most cases reaction occurs with explosive violence in spite of extreme measures which may be taken to moderate its effect. In many instances the reaction products consist mainly of carbonaceous matter and hydrogen fluoride or of other equally undesirable decomposition products. When using a very large excess of fluorine the principal products are generally carbon tetrafluoride and hydrogen fluoride.

Many attempts have been made to use fluorinating agents other than elemental fluorine to replace hydrogen in hydrogen- and halogen-containing organic compounds and thus to obtain desired fluorine-containing organic compounds. Among the fluorinating agents which have been tried may be mentioned hydrogen fluoride, antimony trifluoride, mercuric fluoride, iodine pentafluoride, bromine trifluoride, chlorine trifluoride, and many others. Although certain of these agents may, under certain conditions, replace with fluorine a halogen atom other than fluorine already in the organic molecule, little success has been reported in attempting to replace hydrogen with fluorine using these agents. For this reason it is usually necessary as a step preliminary to the preparation of a desired fluorine-containing organic compound to prepare the corresponding chlorine-, bromine- or iodine-containing compound. This renders processes using these fluorinating agents unduly complicated and, also, the requisite chlorine-, bromine- or iodine-containing compound may not always be prepared readily. In addition, the preparation, using these agents, of partially fluorinated organic compounds having fluorine atoms only in desired positions in the molecule is, except in certain instances, not possible. Furthermore, highly fluorinated organic compounds are not usually obtained readily from the corresponding highly chlorinated, brominated or iodinated compounds using such agents. Certain of the agents referred to, e. g., the halogen fluorides, react with many organic compounds with explosive violence.

Most metal fluorides heretofore proposed as agents to replace chlorine, bromine or iodine in organic compounds with fluorine are without substantial effect in replacing hydrogen with fluorine. Furthermore, such metal fluorides tend to produce polymerized or unsaturated breakdown products and do not usually lead to complete or uniform replacement of chlorine, bromine or iodine with fluorine. For these and other reasons fluorine-containing organic compounds, particularly compounds containing fluorine and another halogen, have with few exceptions not heretofore been available and industry has been deprived of many members of this group of compounds which, due to their non-flammability and to the thermal stability of the more highly fluorinated members, are especially valuable. The need for new and improved procedures for the preparation of fluorine-containing organic compounds is evident.

It is, therefore, an object of the present invention to provide a method for the preparation of fluorine-containing organic compounds. Still a further object is to provide a method whereby a fluorine-containing organic compound may be prepared from a partially chlorinated, brominated or iodinated organic compound. An additional object is to provide a method whereby a fluorine-containing organic compound may be prepared from a partially halogenated organic compound containing two or more different halogens. An additional object is to provide a method whereby the fluorine content of a partially fluorinated organic compound may be increased. An additional object is to provide a method whereby hydrogen in hydrogen- and halogen-containing organic compounds may be replaced with fluorine. An additional object is to provide a method for preparing a fluorine-containing organic compound whereby the formation of undesirable decomposition or polymerization products is substantially avoided. An additional object is to provide a fluorination method which is not subject to certain of the disadvantages set forth above. Still a further object is to provide a novel fluorinating agent capable of replacing hydrogen in halo organic compounds with fluorine. Still an additional object is to provide new and novel fluorine-containing organic compounds, including halocarbons, fluorocarbons and other highly fluorinated substances. Other objects will become apparent from the following specification and claims.

According to the present invention the foregoing and related objects are accomplished readily and economically by contacting an organic compound containing hydrogen and a halogen with lead tetrafluoride under suitable reaction conditions. Lead tetrafluoride has been found to be an excellent fluorinating agent for hydrogen- and halogen-containing organic compounds, and when the reaction is carried out under conditions hereinafter described it may be controlled without difficulty. Halogen other than fluorine as well as hydrogen in hydrogen- and halogen-containing organic compounds may be replaced readily with fluorine so that perhalo organic compounds containing substantially any desired proportion of fluorine, including perfluoro compounds, may, if desired, be produced with the formation of little or no decomposition or polymerization products. Aliphatic, aromatic, heterocyclic and alicyclic compounds, including fused-ring compounds and polycarbocyclic non-fused-ring compounds, containing hydrogen and a halogen may be fluorinated readily with lead tetrafluoride.

Unsaturated hydrogen- and halogen-containing organic compounds, such as vinylidene chloride, trichloroethylene, bromobutylene, chlorocyclohexene, monochlorobenzene, dibromobenzene, iodobenzene, chlorotoluene, chlorobiphenyl, bromoanthracene, chloronaphthalene and their substitution derivatives may be fluorinated readily with lead tetrafluoride. In the fluorination of unsaturated organic compounds replacement of hydrogen is usually, but not always, accompanied by or preceded by the addition of fluorine atoms at the points of unsaturation with the production of saturated fluorine-containing compounds.

Examples of fluorine-containing organic compound containing hydrogen and a halogen other than fluorine, which may be prepared according to the method of the invention by the partial fluorination with lead tetrafluoride of organic compounds containing hydrogen and a halogen other than fluorine, include monochloromonofluoromethane, monofluoromonobromomethane, difluoromonochloroethane, tetrafluoromonochloroethane, monofluorotrichloroethane, difluoromonochloromonobromoethane, tetrafluoromonochlorobutane, difluorodichlorohexane, tetrafluoropentachloroheptane, difluorodichloroethyl ether, tetrafluorodichlorobutyl ether, monofluoromonochloroacetyl fluoride, monochloromonofluorocyclohexane, octafluorodichlorocyclohexane, tetrafluorodichloropiperidine, and many others.

Examples of perhalo organic compounds containing at least one halogen other than fluorine which may be prepared by the method of the invention include monochlorotrifluoromethane, dichlorodifluoromethane, trichloromonofluoromethane, tetrachlorodifluoroethane, dichlorotetrafluoroethane, monobromomonochlorotetrafluoroethane, pentafluoromonobromoethane, decafluorodichlorocyclohexane, difluoromonochloroacetyl fluoride, dichloroperfluoroheptane, pentafluoromonoiodoethane, dichloroperfluoropiperidine, and many others.

Examples of hydrogen- and fluorine-containing organic compounds which may be fluorinated with lead tetrafluoride to form compounds of increased fluorine content, including perhalo or perfluoro compounds are, methyl fluoride, trifluoromethane, monochloromonofluoromethane, monobromodifluoroethane, monochloropentafluoroheptane, vinylidene fluoride, monochloromonofluoroethylene, monofluorobenzene, difluoronaphthalene, monochloromonofluorobenzene, benzotrifluoride, bis-trifluoromethyl benzene, monofluorocyclohexane, monobromomonochloromonofluorocyclohexane, fluorocyclohexene, and the like.

According to one modification of the invention, perfluorination may be accomplished and perfluoro compounds may be obtained by contacting an organic compound containing at least one hydrogen atom and at least one halogen atom attached to carbon with lead tetrafluoride as an active fluorinating agent under such conditions and for such time that all of such hydrogen and of such halogen other than fluorine in the molecule is replaced by fluorine. This may be described as perfluorination. Examples of perfluoro organic compounds which may be prepared by the method of the invention include carbon tetrafluoride, hexafluoroethane, dodecafluoropentane, dodecafluorocyclohexane, perfluoromethylcyclohexane, perfluorobicyclohexyl, perfluorodecahydronaphthalene, perfluorodibutyl ether, perfluoropiperidine, trifluoroacetyl fluoride, and the like.

In certain instances rupture of the molecule may, if desired, be effected with the formation of fluorine-containing compounds having fewer carbon atoms in the molecule than does the original hydrogen- and halogen-containing organic compound fluorinated. Thus high molecular weight halohydrocarbons may, for example, be converted with lead tetrafluoride largely to high molecular weight fluorine-containing halocarbons, to high molecular weight saturated fluorocarbons, i. e., to saturated compounds containing only carbon and fluorine, or, under more vigorous conditions of temperature, to compounds having fewer carbon atoms in the molecule, such as hexafluoroethane and even carbon tetrafluoride, if desired. Compounds containing oxygen, sulfur or nitrogen in addition to hydrogen and a halogen, such as the halogen substitution products of diethyl ether, dibutyl ether, acetic anhydride, nitrobenzene, nitromethane, pyridine, thiophene and quinoline, may be fluorinated with the replacement of a part or all of the hydrogen atoms, and frequently of all chlorine, bromine or iodine atoms, in the molecule with fluorine to yield partially or completely fluorinated compounds. Although the reaction is exothermic, it proceeds without explosive violence and may be controlled readily so as to produce fluorine-containing organic compounds containing substantially any desired proportion of fluorine. The fluorination reaction is carried out at a temperature between about 0° C., or somewhat lower, and about 500° C., or somewhat higher.

During the course of the reaction the lead tetrafluoride used as a fluorinating agent is converted largely to lead difluoride from which lead tetrafluoride may be regenerated readily by simply exposing the difluoride to elemental fluoride at an elevated temperature. The reaction is thus well adapted to being carried out in cyclical manner, the lead tetrafluoride being first contacted with the organic reactant to produce a desired fluorine-containing organic compound and the spent lead tetrafluoride, consisting largely of lead difluoride, then regenerated with elemental fluorine and the cycle repeated as often as desired. Thus the consumption of lead tetrafluoride in the process is reduced to a minimum and consists only of such negligible quantities as may be lost mechanically during the process. Furthermore, it may be desirable in some instances when a highly fluorinated product is desired, to effect only a part of the desired fluorination during the first pass of the organic reactant through the fluorination reactor and then to recycle the fluorine-containing product over fresh or regenerated lead tetrafluoride to introduce a further proportion of fluorine into the organic molecule. Recycling of the fluorine-containing organic product may, if desired, be continued until perhalogenation is effected, the final product being substantially free of hydrogen, of unsaturated carbon-carbon linkages, and further, if desired, of halogen other than fluorine.

Lead tetrafluoride is a solid which is unstable in the presence of water or atmospheric moisture. The compound is substantially stable when dry at temperatures as high as 500° C. and higher. Lead tetrafluoride may be prepared readily in a number of ways, one convenient way being by the treatment of anhydrous lead difluoride with elemental fluorine at an elevated temperature, e. g., at temperatures above about 150° C., preferably at a temperature between about 250° and about 500° C. Lead difluoride may be prepared readily by treating anhydrous lead dichloride with hydrogen fluoride or fluorine at temperatures above about 150° C., and in many other ways. In practicing the invention it has been found convenient to place anhydrous lead dichloride in the reaction vessel in which the subsequent fluorination of a hydrogen- and halogen-containing organic compound is to be carried out, and then to treat the lead dichloride in the vessel first with hydrogen fluoride and then with elemental fluorine under the requisite conditions of temperature.

The fluorination of organic compounds containing hydrogen and a halogen using lead tetrafluoride as an active fluorinating agent may be carried out in any convenient manner and in any convenient type of apparatus. It has been found satisfactory to dispose the lead tetrafluoride in a thin layer, e. g., in a layer from about one-half inch to about one inch thick, on shelves or trays within the reaction vessel, or directly on the floor of the vessel itself, and to pass the hydrogen- and halogen-containing organic reactant in vapor form through the vessel. The process is frequently carried out by distributing a shallow layer of lead tetrafluoride throughout the length of a metal tube and passing the organic reactant in vapor form through the tube. If desired, tubes with rectangular cross section may be used and the exposed surface of the layer of lead tetrafluoride thus increased. The mass may be agitated, if desired. The physical form of the lead tetrafluoride is preferably such that easy penetration of the mass of tetrafluoride by gases or vapors passing through the reaction vessel is facilitated. Lead tetrafluoride in granulated or coarsely powdered form has been found to be satisfactory.

The reaction vessel, which may be of iron, nickel or of other material resistant to the reactants and reaction products under the conditions of fluorination and regeneration is maintained at the desired reaction temperature by any convenient means. Heating may be effected in any of a number of ways, such as by electrical resistance heaters, by carefully controlled gas flames, or by immersing the reaction vessel in a suitable high-boiling liquid such as a low-melting alloy. The fluorination reaction is exothermic in nature and in large size reaction vessels heating may not be necessary after the reaction has started. In some instances cooling may even be necessary.

The fluorination of a halogen- and hydrogen-containing organic compound using lead tetrafluoride may be carried out with the organic reactant in either liquid or gaseous phase. In practice, however, it has usually been found more convenient, especially when high temperatures are required, to pass the organic reactant through the reactor in vapor form. In this way the handling of liquids at high temperatures is avoided and the reaction may be carried out at ordinary pressures. The organic reactant may be introduced into the reaction vessel either in the form of its vapor or as a thin stream of liquid. In the latter instance the organic reactant is usually vaporized in the portion of the reaction vessel nearest the entry port and the vapors are then fluorinated as they pass through the remaining part of the vessel. Alternatively the organic reactant may be heated in a vessel separate from the fluorination vessel, a stream of inert gas, such as nitrogen, hydrogen fluoride or helium, passed through the heated liquid, and the mixed vapors of inert gas and of organic reactant then passed through the fluorination vessel. Fluorination with the organic reactant in the vapor phase is convenienly carried out at atmospheric pressure although it may, if desired, be carried out at a pressure higher or lower than atmospheric pressure.

Although fluorination of a hydrogen- and halogen-containing organic substance in the vapor phase using lead tetrafluoride as the active fluorinating agent is usually carried out at a temperature between about 0° C., or somewhat lower, and about 500° C., or somewhat higher, preferably between about 20° and about 450° C., it may be carried out at any convenient temperature above the condensing temperature of the vapors at the reaction pressure. In certain instances the temperature of fluorination may even be maintained sufficiently high to cause a desired thermal decomposition or cracking of the organic reactant along with the fluorination reaction. Temperatures sufficiently high to cause the formation of substantial amounts of undesired by-products are usually avoided.

After the lead tetrafluoride has been largely exhausted and converted substantially to lead difluoride, the reaction vessel may be swept with nitrogen or other inert gas to free it from most of the organic substances before elemental fluorine is admitted to the reaction vessel to regenerate lead tetrafluoride. In this way the possible explosive reaction of residual organic vapor with elemental fluorine within the reaction vessel is avoided. Regeneration of the spent lead tetrafluoride is, as noted above, carried out at a temperature above about 150° C., usually at a temperature between about 250° and about 500° C.

As mentioned previously the process of the invention may, if desired, be carried out with the hydrogen- and halogen-containing organic reactant in the liquid phase in which case the organic reactant and lead tetrafluoride may be mixed together in any convenient way, e. g., the organic reactant may simply be stirred in a vessel at the desired temperature and the lead tetrafluoride added gradually thereto. Such procedure with the organic reactant in the liquid phase is of particular value when the organic reactant boils at a high temperature. It has been found that the ratio of the amount of lead tetrafluoride to the amount of organic reactant necessary when a high degree of fluorination is to be effected is so great that when the reaction is carried out with the organic reactant in liquid phase the final reaction mixture is frequently of a moist granular nature rather than of a fluid nature and is difficult to handle on a large scale. This difficulty may be overcome in a number of ways. Thus the liquid which is to be fluorinated may be diluted with a liquid inert under the reaction condition, such as a high boiling fluorocarbon, to increase the proportion of liquid in the reaction mixture.

Alternatively fluorination with the organic reactant in the liquid phase may be carried out step-wise. Thus in the first step the addition of solid lead tetrafluoride to the liquid organic reactant may be stopped while the mixture is still fluid enough to be agitated readily. The mixture may be filtered or otherwise treated to separate the organic and inorganic portions thereof, the spent lead tetrafluoride freed from organic products and regenerated with fluorine, and the partially fluorinated organic portion then fluorinated further by adding to it regenerated or fresh lead tetrafluoride. It is readily apparent that in most instances the fluorination reaction is more conveniently carried out with the organic reactant in vapor phase although the invention is not limited to such procedure.

The degree of fluorination effected is dependent, among other factors, upon the reaction temperature and the time of contact of the hydrogen- and halogen-containing organic reactant with lead tetrafluoride. In order to effect a high degree of fluorination, e. g., perfluorination, of the organic reactant in the vapor phase during a single pass through the reaction vessel, it may be necessary to pass the reactant vapor very slowly through the vessel thus limiting the rate at which a highly fluorinated product may be produced in any particular reaction vessel. It has also been found that many hydrogen- and halogen-containing organic substances are somewhat more thermally unstable in the unfluorinated or only lowly fluorinated state than when they are more highly fluorinated and that, when it is attempted to fluorinate such unfluorinated or lowly fluorinated substances to produce a highly fluorinated substance during a single pass of the vapor through the fluorination vessel, it may be necessary to elevate the temperature to such a degree that considerable decomposition of the organic reactant may occur before substantial fluorination occurs.

For these and other reasons it is frequently convenient and desirable to recycle the organic reactant after it has been partially fluorinated, usually after the spent lead tetrafluoride has been regenerated to insure there being a high proportion of lead tetrafluoride in the lead fluoride mass. This recycling of the organic product may be repeated as many times as is desirable or necessary to introduce the desired number of fluorine atoms into the molecule and each recycling is preferably, but not necessarily, carried out at a temperature higher than the preceding one. In this way the first stages of fluorination, which do not require high temperatures and during which relatively unstable organic compounds may be present in the fluorination vessel, are carried out at a relatively low temperature while later stages of fluorination, which usually require a higher temperature and during which only relatively stable fluorine-containing substances are present in the fluorination vessel, are carried out at a higher temperature. It is obvious that the same effect may be obtained by passing the organic reactant through a number of reaction vessels or towers in series, each containing lead tetrafluoride and each maintained at a reaction temperature which may, if desired, be higher than that of the preceding vessel. By a suitable arrangement of a number of reaction vessels in series the process may be carried out continuously, it being only necessary to by-pass the vapors of the organic reactant around any one of the reaction vessels while the spent lead tetrafluoride therein is being regenerated with fluorine.

It should be noted that during the portion of the fluorination reaction which involves the replacing of hydrogen with fluorine, the replaced hydrogen appears in the reaction product as hydrogen fluoride. When the fluorination involves the replacement of a chlorine, a bromine or an iodine atom with a fluorine atom, the replaced halogen appears in the reaction product in elemental form. When, however, a portion of the reaction involves the addition of fluorine to a carbon-carbon unsaturated bond neither hydrogen fluoride nor elemental halogen other than fluorine is formed as a result of this portion of the reaction. The effluent vapors from the reaction thus contain, in addition to the desired fluorine-containing organic compound, hydrogen fluoride and may, depending upon the particular compound fluorinated and the degree of fluorination effected, contain a halogen other than fluorine in elemental form together, in some instances, with unfluorinated or partially fluorinated organic reactant. In certain other instances, e. g., in the fluorination of oxygen-, sulfur- or nitrogen-containing compounds accompanied by rupture of the molecule, oxygen-, sulfur- or nitrogen-containing by-products may also be present.

The reaction product may be treated in any convenient manner to recover therefrom the desired fluorinated product. One convenient way in the case of vapor phase fluorination consists in cooling and condensing effluent vapor and treating the condensed liquid to separate therefrom the desired organic fluorine-containing product. Highly fluorinated organic compounds are usually substantially insoluble in anhydrous hydrogen fluoride and, when a mixture of the vapors of such compounds and hydrogen fluoride are condensed, two liquid layers are usually apparent, one of which consists principally of anhydrous hydrogen fluoride and the other of which consists principally of highly fluorinated organic compounds. These layers may be separated and anhydrous hydrogen fluoride thus recovered as a valuable by-product. The layer of highly fluorinated organic compounds or, in case two layers are not apparent in the condensed product, the entire liquid reaction product may be treated in any one of a number of ways. Thus the liquid may be fractionally distilled and the desired fraction collected, or it may be washed with water and subsequently with a dilute aqueous alkali to free it from elemental halogen, hydrogen fluoride and other acidic substances and then fractionally distilled. In any event a desired fluorine-containing organic compound is collected and a less highly fluorinated fraction may, if desired, be recycled to the fluorination reaction vessel to increase the proportion of fluorine in the fraction.

In the case of fluorination with the organic reactant in the liquid state, the reaction mixture may be filtered or otherwise treated to separate the organic and inorganic constituents. The inorganic constituents, consisting mainly of spent lead tetrafluoride may be dried, or washed with a low boiling organic liquid and dried, and then regenerated with elemental fluorine. The organic constituents may be washed with water and with dilute aqueous alkali to free them from acidic substances, and the mixture then fractionally distilled. Inert liquid diluents and insufficiently fluorinated organic substances collected during the distillation may be returned, either together or separately, to the fluorination vessel and the fluorine content of the insufficiently fluorinated portion increased by further treatment with lead tetrafluoride. Other ways of recovering the desired fluorine-containing organic product from the reaction mixture will be apparent to those familiar with the art and the present invention is not limited as to such methods of recovery.

Certain advantages of the invention are apparent from the following examples which are given by way of illustration only and are not to be construed as limiting.

*Example 1*

An iron tube fitted with means for heating at any desired temperature was packed loosely with several mols of lead dichloride. The tube and contents were heated at about 300° C. and anhydrous hydrogen fluoride passed through the tube for several hours. Elemental fluorine was then passed through the tube for several hours until the gases issuing from the tube contained a high proportion of fluorine. The lead dichloride in the tube was then converted almost entirely to lead tetrafluoride. The lead tetrafluoride was used without removal from the tube for fluorinating hydrogen- and halogen-containing organic compounds, said fluorinations involving in each case the replacement of at least a part of the hydrogen in the organic compound with fluorine.

*Example 2*

Lead tetrafluoride prepared as described in Example 1 was heated at 400° C. and several milliliters of a fluorinated cyclohexane containing 67.2 by weight of fluorine was passed through the reactor over a period of 2 hours. The reactor was then flushed with nitrogen for 2 hours, the gases from both operations being cooled sufficiently to condense substantially all of the organic substituents therein. The condensate was washed with water, then with dilute sodium hydroxide and dried. Upon distillation, the major portion of the washed condensate boiled at 50–51° C. The distillate consisted principally of perfluorocyclohexane melting at 49° C. and containing 76 per cent by weight of fluorine.

*Example 3*

For the continuous fluorination of benzotrifluoride two copper reactor tubes each 120 inches long and 1.25 inches in diameter are provided. Each is packed loosely with lead difluoride and the difluoride converted to lead tetrafluoride by passing elemental fluorine through the tubes at about 300° to 350° C. The temperature of one of the tubes containing lead tetrafluoride is maintained at about 300° C. and 109 grams of benzotrifluoride vapor is passed through the tube over a period of five hours, the exit vapors being cooled to condense hydrogen fluoride and organic fluorination products of the reaction. At the end of the five hour period, the stream of benzotrifluoride vapor is switched to the second tube maintained at about 300° C. and containing lead tetrafluoride and the reaction continued in this tube until about 109 grams of benzotrifluoride has been used, the vapors issuing from the reactor being cooled as before. During the period when fluorination is occurring in the second tube, the spent lead tetrafluoride in the first tube is regenerated by passing elemental fluorine through the tube at a temperature of 300° to 350° C. The stream of benzotrifluoride vapors is then switched back to the first tube, the spent lead tetrafluoride in the second tube regenerated with fluorine, and fluorination of the benzotrifluoride carried on continuously in this manner for as long as desired, the steps of fluorination of benzotrifluoride and of regenerating the spent lead tetrafluoride being carried on alternately in each of the two tubes.

The condensate from the fluorination reaction separates into two layers one of which consists of substantially pure hydrogen fluoride and the other of which consists of the crude fluorination product of benzotrifluoride. The layers are separated, the hydrogen fluoride layer being saved as a valuable by-product and the fluorinated benzotrifluoride layer being utilized or treated in any desired manner. A sample of the product, after washing with dilute aqueous alkali and water and distilling without fractionation, contains between 70 and 73 per cent by weight of fluorine. A typical product contains 71.4 per cent of fluorine.

In similar manner other hydrogen- and halogen-containing, including partially fluorinated chlorinated or brominated organic products, methane, butane, heptane, octane, diethyl ether, dibutyl ether, naphthalene, ethylene, styrene, benzene, toluene, xylene, diethylbenzene, pyridine, acetic acid, acetic anhydride, paraffin, and lubricating oil are fluorinated continuously to produce products wherein at least a part of the hydrogen is replaced with fluorine.

*Example 4*

Nonafluoromesitylene is fluorinated by passing it, in the vapor state, through a reactor filled with a large excess of lead tetrafluoride at about 250° C. and then recycling the product through the reactor at about 350° C. Perfluoro-1,3,5-trimethylcyclohexane is obtained in high yield.

*Example 5*

Trichloroethylene was fluorinated with lead tetrafluoride at 225° C. The reaction product was condensed in a cooled receiver, washed with water and fractionally distilled. One of the products isolated consisted of a perhalo compound containing 62.4 by weight of fluorine and 15.2 per cent by weight of chlorine.

*Example 6*

A mixture of partially fluorinated compounds weighing 181 grams and containing 60 per cent of fluorine, obtained by fluorinating mixed pentenes, was contacted with an excess of lead tetrafluoride at 375° C. A substantially quantitative yield of perfluoropentane was obtained.

*Example 7*

One hundred-forty grams of benzoyl chloride was fluorinated at 250° C. using an excess of lead tetrafluoride as the active fluorinating agent. The product was recycled twice over regenerated lead tetrafluoride. There was isolated from the product 59. grams of perfluorocyclohexane.

We claim:

1. The method for the perhalogenation of an organic compound containing hydrogen and halogen attached to carbon which includes the step of reacting the vapor of said organic compound with lead tetrafluoride at a fluorinating temperature between about 20 degrees and about 500 degrees centigrade for a period of time sufficient to accomplish replacement, with fluorine, of all hydrogen bound to carbon in the starting hydrohalo organic compound, with resulting perhalogenation of the organic compound, and separating a fluorine-containing perhalo organic compound having the same number of carbon atoms in the molecule as the starting compound from the reaction product.

2. The method as claimed in claim 1, wherein the starting hydrogen- and halogen-containing organic compound contains at least one fluorine atom in the molecule.

3. The method as claimed in claim 1, wherein the starting hydrogen- and halogen-containing organic compound is a saturated compound.

4. The method as claimed in claim 1, wherein the starting hydrogen- and halogen-containing organic compound is a halo-hydrocarbon.

5. The process of claim 1, wherein the hydrogen- and halogen-containing organic compound treated contains at least one halogen atom other than fluorine and wherein the fluorine-containing perhalo compound separated contains at least two different halogens in the molecule.

6. The process of claim 1, wherein the hydrogen- and halogen-containing compound treated contains at least one chlorine atom and wherein the fluorine-containing perhalo compound separated also contains chlorine.

7. The method for the perhalogenation of an organic compound containing hydrogen and a halogen attached to carbon, which includes the step of reacting the vapor of said organic compound with lead tetrafluoride at a fluorinating temperature between about 225 degrees and about 500 degrees centigrade for a period of time sufficient to accomplish perhalogenation of the organic compound, and separating a fluorine-containing perhalo organic compound having the same number of carbon atoms in the molecule as the starting organic compound from the reaction product.

8. The process of claim 7, wherein a fluorine-containing perhalo organic compound is separated from the reaction product and a non-perhalogenated fluorine-containing organic constituent of the reaction product recycled to the fluorination step.

9. The process of claim 8, wherein the process is conducted under conditions of progressively increasing temperature between about 225 and 500 degrees centigrade.

10. The process of claim 7, wherein the perhalo organic compound, separated from the reaction product contains no halogen other than fluorine.

EARL T. McBEE.
RICHARD M. ROBB.

REFERENCES CITED

The following references are of record in the file of this patent:

UNITED STATES PATENTS

| Number | Name | Date |
|---|---|---|
| 2,004,932 | Daudt et al. | June 18, 1935 |
| 2,013,035 | Daudt et al. | Sept. 13, 1935 |
| 2,024,008 | Midgley et al. | Dec. 10, 1935 |
| 2,062,743 | Daudt et al. | Dec. 1, 1936 |
| 2,090,772 | Wiezevich | Aug. 24, 1937 |
| 2,192,143 | Midgley et al. | Feb. 27, 1940 |
| 2,220,713 | Grosse et al. | Nov. 5, 1940 |
| 2,238,242 | Balon et al. | Apr. 15, 1941 |
| 2,423,045 | Passino et al. | June 24, 1947 |
| 2,426,172 | Benning et al. | Aug. 26, 1947 |

FOREIGN PATENTS

| Number | Country | Date |
|---|---|---|
| 214,293 | Great Britain | Apr. 14, 1924 |
| 3141/31 | Australia | Jan. 20, 1933 |
| 429,591 | Great Britain | May 28, 1935 |
| 786,123 | France | June 3, 1935 |

OTHER REFERENCES

Henne et al., J. A. C. S., vol. 63, pages 3478–3479 (1941).

Dimroth et al., Ber. deutsch. chem. Ges., vol. 64, pages 516–522 (1931).

Wartenberg, Zeitschr. Anorg. Allgem. Chem., vol. 244, pages 337–347, (1940).

Moissan, "Comptes rendus," vol. 130, pages 622–627 (1900).

Ruff and Giese, "Zeit. Anorg. Allgem. Chem.," vol. 219, pages 143 to 148 (1934).